United States Patent
Ramsdell

(10) Patent No.: US 7,236,331 B2
(45) Date of Patent: Jun. 26, 2007

(54) SYSTEM AND METHOD TO PROVIDE A RAMP HAVING A LOCATION WHICH IS TRANSITIONING FROM A FIRST GRADE TO A SECOND GRADE FOR REMOVING A READ/WRITE HEAD FROM A MEDIA

(75) Inventor: Richard G. Ramsdell, Saratoga, CA (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 431 days.

(21) Appl. No.: 11/004,138

(22) Filed: Dec. 3, 2004

(65) Prior Publication Data

US 2005/0141139 A1 Jun. 30, 2005

Related U.S. Application Data

(60) Provisional application No. 60/533,111, filed on Dec. 30, 2003, provisional application No. 60/533,352, filed on Dec. 30, 2003.

(51) Int. Cl.
*G11B 5/54* (2006.01)

(52) U.S. Cl. .................................. 360/254.8

(58) Field of Classification Search ............. 360/254.8, 360/255.7
See application file for complete search history.

(56) References Cited

U.S. PATENT DOCUMENTS

| | | | |
|---|---|---|---|
| 4,933,785 A | 6/1990 | Morehouse et al. ..... | 360/78.04 |
| 5,008,768 A | 4/1991 | Carlson et al. ............ | 360/104 |
| 5,027,241 A | 6/1991 | Hatch et al. .............. | 360/105 |
| 5,208,712 A | 5/1993 | Hatch et al. .............. | 360/98.01 |
| 5,341,260 A | 8/1994 | Jabbari ..................... | 360/105 |
| 5,394,281 A | 2/1995 | Kajitani ................... | 360/105 |
| 5,455,723 A | 10/1995 | Boutaghou et al. ....... | 360/75 |
| 5,831,786 A | 11/1998 | Boutaghou et al. ....... | 360/75 |
| 5,872,669 A | 2/1999 | Morehouse et al. ....... | 360/69 |
| 5,875,072 A | 2/1999 | Brooks, Jr. et al. ....... | 360/104 |
| 5,936,788 A | 8/1999 | Boutaghou et al. ....... | 360/75 |
| 6,067,208 A | 5/2000 | Segar ........................ | 360/105 |
| 6,084,753 A | 7/2000 | Gillis et al. ............... | 360/128 |
| 6,091,577 A | 7/2000 | Ho et al. ................... | 360/105 |
| 6,134,071 A | 10/2000 | Andoh et al. ............. | 360/75 |
| 6,201,665 B1 | 3/2001 | Angellotti et al. ........ | 360/255.7 |
| 6,226,154 B1 * | 5/2001 | Albrecht ................... | 360/254.8 |
| 6,229,663 B1 | 5/2001 | Yoneda et al. ............ | 360/75 |
| 6,243,222 B1 | 6/2001 | Boutaghou et al. ....... | 360/73.03 |
| 6,344,950 B1 | 2/2002 | Watson et al. ............ | 360/254.3 |
| 6,362,935 B1 | 3/2002 | Rich .......................... | 360/236.7 |
| 6,396,652 B1 | 5/2002 | Kawachi et al. .......... | 360/75 |
| 6,437,945 B1 | 8/2002 | Hawwa et al. ............ | 360/254.8 |
| 6,452,753 B1 | 9/2002 | Hiller et al. ............... | 360/254.7 |
| 6,456,456 B1 | 9/2002 | Romig et al. ............. | 360/99.02 |
| 6,480,361 B1 | 11/2002 | Patterson .................. | 360/254.3 |
| 6,487,052 B1 * | 11/2002 | Macpherson et al. .... | 360/256.2 |

(Continued)

*Primary Examiner*—A. J. Heinz
(74) *Attorney, Agent, or Firm*—Fliesler Meyer LLP

(57) ABSTRACT

Methods to provide a ramp to remove a read/write head connected with a suspension from a media in accordance with the present invention can comprise calculating a grade of one or more surfaces having a plurality of progressively shallower grades. A transition between a steep grade and a less steep grade can occur at a nominal location at which the read/write head is removed from communicative proximity with the media. By shaping a ramp such that it includes a maximum steep grade, a surface of the media can have an optimized data region, potentially increasing the spacing of tracks or alternatively increasing the capacity of the media.

24 Claims, 8 Drawing Sheets

U.S. PATENT DOCUMENTS

| | | | |
|---|---|---|---|
| 6,515,959 B1 | 2/2003 | Fairchild | 369/300 |
| 6,545,843 B1 | 4/2003 | Suzuki | 360/245.1 |
| 6,556,373 B1 | 4/2003 | Mamiya et al. | 360/99.02 |
| 6,560,057 B1 | 5/2003 | Klaassen et al. | 360/75 |
| 6,560,074 B2 | 5/2003 | Gillis et al. | 360/245.7 |
| 6,590,731 B1 | 7/2003 | Pan et al. | 360/75 |
| 6,621,651 B1 | 9/2003 | Ratliff et al. | 360/75 |
| 6,628,475 B2 | 9/2003 | Nakamoto et al. | 360/97.02 |
| 6,665,146 B2 | 12/2003 | Hawwa et al. | 360/234 |
| 6,667,855 B2 | 12/2003 | Suzuki | 360/236.2 |
| 6,674,611 B2 | 1/2004 | Bolasna et al. | 360/236.2 |
| 6,680,811 B2 | 1/2004 | Gillis et al. | 360/75 |
| 6,717,773 B2 | 4/2004 | Hawwa et al. | 360/254.7 |
| 6,738,216 B2 | 5/2004 | Kawana et al. | 360/75 |
| 6,747,843 B2 | 6/2004 | Sharma et al. | 360/128 |
| 6,765,746 B2 | 7/2004 | Kusumoto | 360/75 |
| 6,765,762 B2 | 7/2004 | Yanagihara | 360/254.8 |
| 6,920,007 B2 | 7/2005 | Tominaga et al. | 360/75 |
| 2001/0012171 A1 | 8/2001 | Lu et al. | |
| 2003/0011937 A1 | 1/2003 | Gan et al. | |
| 2003/0043510 A1 | 3/2003 | Miyamoto et al. | |
| 2003/0090841 A1 | 5/2003 | Muraki et al. | |
| 2003/0117741 A1 | 6/2003 | Kusumoto | |

\* cited by examiner

SYSTEM AND METHOD TO PROVIDE A RAMP HAVING A LOCATION WHICH IS TRANSITIONING FROM A FIRST GRADE TO A SECOND GRADE FOR REMOVING A READ/WRITE HEAD FROM A MEDIA

CLAIM TO PRIORITY

This application claims benefit to U.S. Provisional Application No. 60/533,111, filed Dec. 30, 2003 and U.S. Provisional Application No. 60/533,352, filed Dec. 30, 2003, both of which are incorporated herein in their entireties.

TECHNICAL FIELD

The present invention relates to rotating media data storage devices, as for example magnetic or optical hard disk drive technology.

BACKGROUND

A hard disk drive typically contains one or more disks clamped to a rotating spindle, at least one head for reading data from and/or writing data to the surfaces of each disk, and an actuator utilizing linear or rotary motion for positioning the head(s) over selected data tracks on the disk(s). A rotary actuator is a complex assembly that couples slider(s) on which head(s) are attached to a pivot point that allows each head to sweep across a surface of a rotating disk.

A disk and a slider can each be extremely smooth, and strong adhesive forces can prevent the disk from rotating during a "power-on" cycle if the slider is landed on the disk surface. To prevent this phenomenon, modern hard disk drives typically use one of two solutions: (1) a narrow area close to the disk center is textured using a laser to create a special landing zone on the disk, or (2) a load-unload ramp is positioned either adjacent to the disk or just over the disk surface. Where a load-unload ramp is used, the head is "parked" by moving the suspension beyond the disk area and sliding the suspension onto a ramp. Parking the head on the ramp can increase the drive's non-operational shock resistance and prevent accidental damage during transportation. To prevent damage to the head during unexpected power loss, the ramp must be sufficiently shallow such that the hard disk drive has enough remaining power to drive the head up the ramp. A shallow ramp extends over more tracks at the outer diameter of the disk than a steep ramp and can cost valuable disk space; however, where a steep ramp is used a hard disk drive may not have sufficient power to properly position the head.

BRIEF DESCRIPTION OF THE FIGURES

Further details of embodiments of the present invention are explained with the help of the attached drawings in which.

DETAILED DESCRIPTION

Figure 1A:
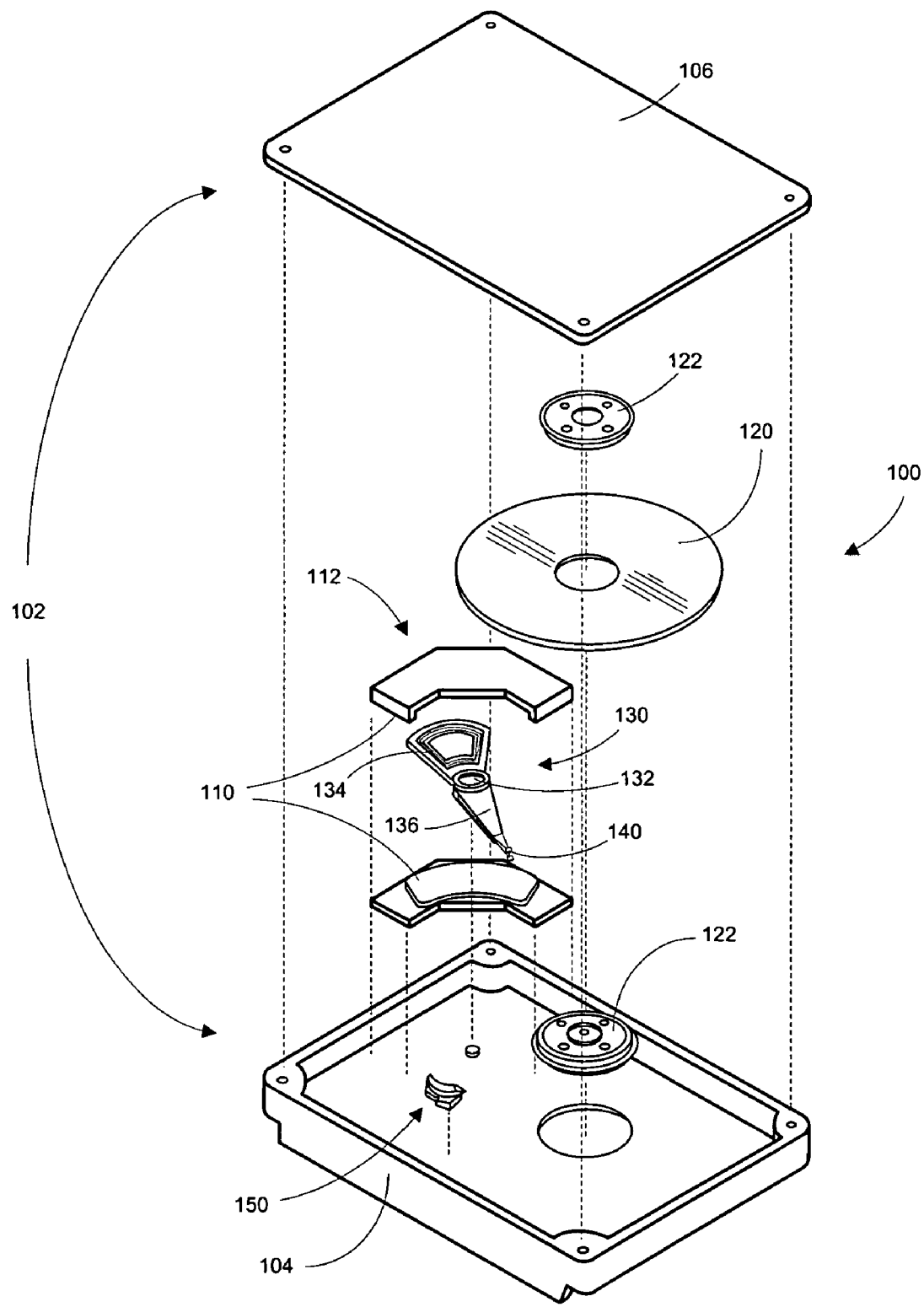
FIG. 1A is an exploded view of a typical hard disk drive utilizing a ramp and a rotary actuator in accordance with one embodiment of the present invention.

FIG. 1A is an exploded view of an exemplary hard disk drive 100 having a ramp 150 in accordance with one embodiment of the present invention. The hard disk drive 100 includes a housing 102 comprising a housing base 104 and a housing cover 106. The housing base 104 illustrated is a base casting, but in other embodiments a housing base 104 can comprise separate components assembled prior to, or during assembly of the hard disk drive 100. A disk 120 is attached to a rotatable spindle motor 122, for example by clamping, and the spindle motor 122 is connected with the housing base 104. The disk 120 can be made of a light aluminum alloy, ceramic/glass or other suitable substrate, with magnetizable material deposited on one or both sides of the disk 120. The magnetic layer has tiny domains of magnetization for storing data transferred through heads 146. In one embodiment, each head 146 is a magnetic transducer adapted to read data from and write data to the disk 120. The disk 120 can be rotated at a constant or varying rate typically ranging from less than 3,600 to more than 15,000 RPM (speeds of 4,200 and 5,400 RPM are common in hard disk drives designed for mobile devices such as laptop computers). The invention described herein is equally applicable to technologies using other media, as for example, optical media. Further, the invention described herein is equally applicable to devices having any number of disks attached to the spindle motor 122. In other embodiments, the head 146 includes a separate read element and write element. For example, the separate read element can be a magneto-resistive head, also known as a MR head. It will be understood that multiple head 114 configurations can be used.

Figure 1B:
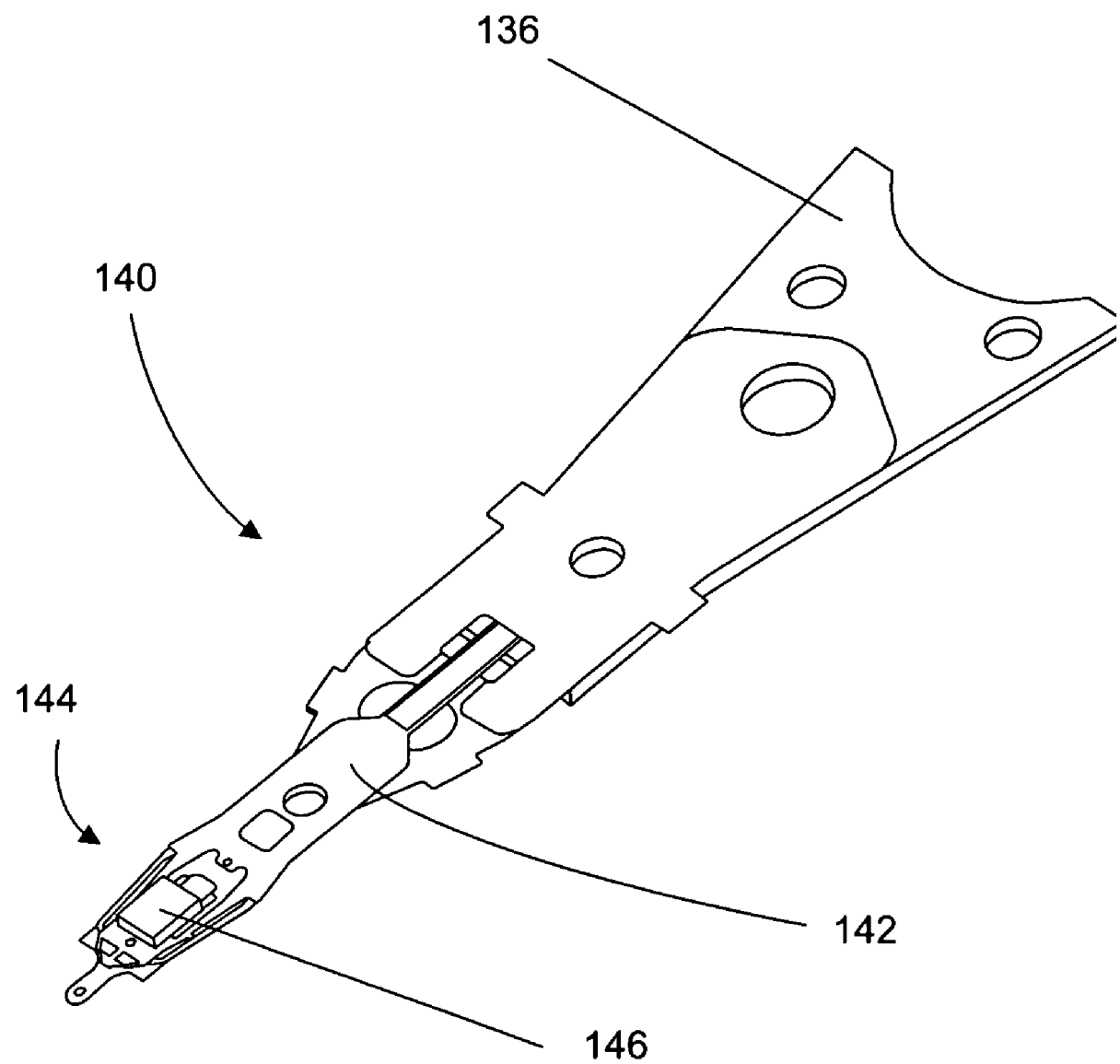
FIG. 1B is a close-up view of a head suspension assembly used in the hard disk drive of FIG. 1A, showing head, slider and suspension.
Figure 1C:
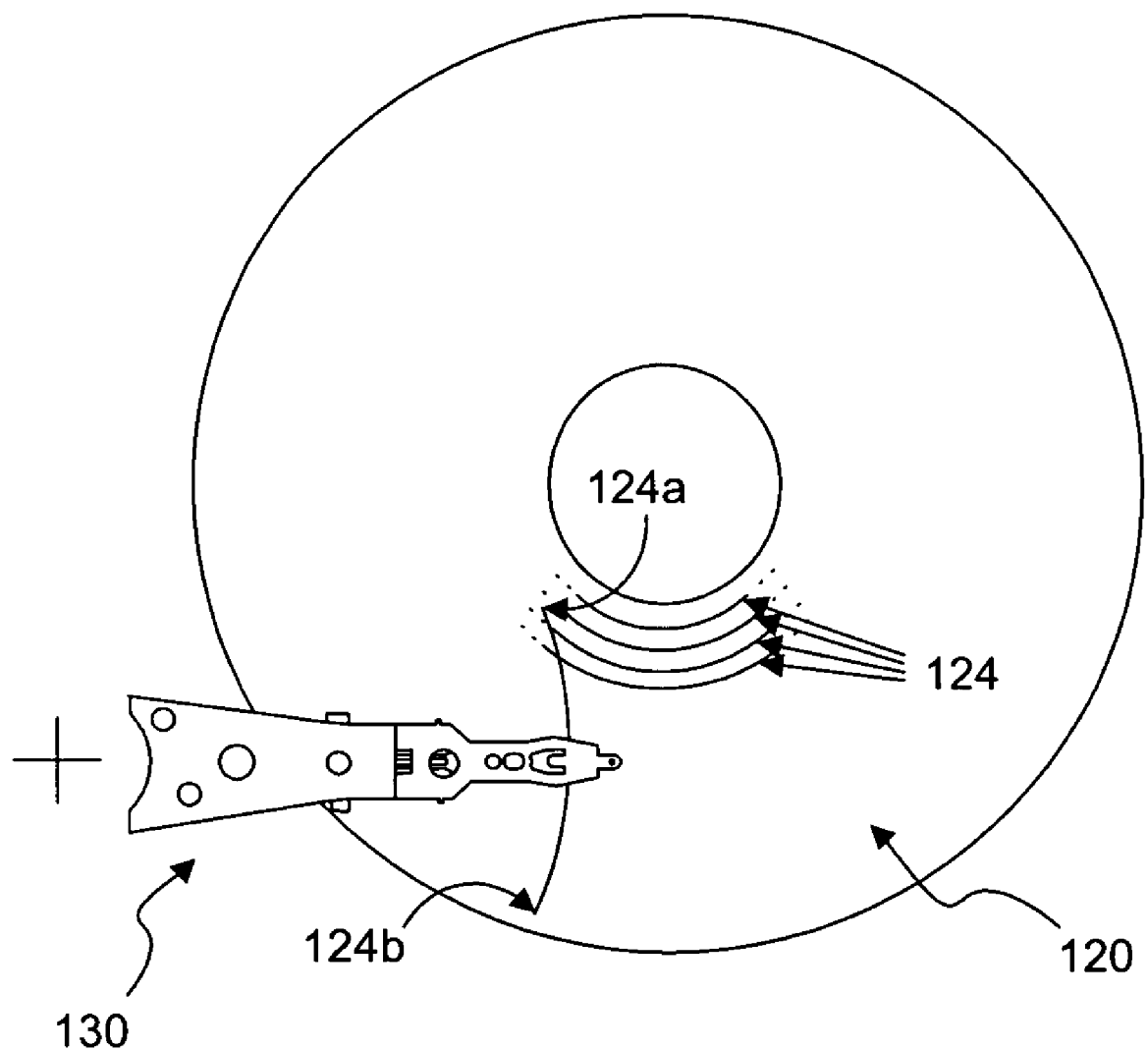
FIG. 1C is an illustration of the rotary motion of a head suspension assembly of FIG. 1B across the surface of a disk.

A rotary actuator 130 is pivotally mounted to the housing base 104 by a bearing 132 and sweeps an arc, as shown in FIG. 1C, between an inner diameter (ID) 124a of the disk and a ramp 150 (shown in FIG. 2) positioned near an outer diameter (OD) 124b of the disk. Attached to the housing 104 are upper and lower magnet return plates 110 and at least one magnet that together form the stationary portion of the voice coil motor (VCM) 112. A voice coil 134 is mounted to the rotary actuator 130 and positioned in an air gap of the VCM 112. The rotary actuator 130 pivots about the bearing 132 when current is passed through the voice coil 134 and pivots in an opposite direction when the current is reversed. The VCM 112 allows for precise positioning of the head 146 along the radius of the disk 120. The VCM 112 is coupled with a servo system (not shown) that uses positioning data read by the head 146 from the disk 120 to determine the position of the head 146 over tracks 124 on the disk 120. The servo system determines an appropriate current to drive through the voice coil 134, and drives the current through the voice coil 134 using a current driver and associated circuitry (not shown).

Each side of a disk 120 can have an associated head 146, and the heads 146 are collectively coupled to the actuator assembly 130 such that the heads 146 pivot in unison. The invention described herein is equally applicable to devices wherein the individual heads separately move some small distance relative to the actuator (this technology is referred to as dual-stage actuation (DSA)).

FIG. 1B details an example of a subassembly commonly referred to as a head suspension assembly (HSA) 140, comprising the head 146 attached to a slider 144, which is further connected with a flexible suspension member (a suspension) 142. The suspension 142 can be connected with an arm 136 which in one embodiment can be either integrally formed with a mount for a bearing 132 or separately attached. The head 114 can be formed on the slider 228 using a number of different techniques, for example the head 114 and slider 228 can be manufactured on a single die using semiconductor processing (e.g. photolithography and reactive ion etching). Spinning of the disk(s) 120 increases air pressure beneath the slider 144, creating a thin air bearing that lifts the slider 144 (and consequently the head 146) off of the surface of the disk 120. A micro-gap of typically less than one micro-inch can be maintained between the disk 120 and the head 146 in one embodiment. The suspension 142 can be bent or shaped to act as a spring such that a force is applied to the surface of the disk 120. The air bearing resists the spring force applied by the suspension 142 and the opposition of the spring force and the air bearing to one another allows the head 146 to trace the surface contour of the rotating disk surface (which is likely to have minute warpage) without "crashing" against the disk surface. When a head 146 "crashes", the head 146 collides with the disk surface such that the head 146 and/or the disk surface is damaged. As is well understood by those of ordinary skill in the art, not all heads ride an air bearing as described above. This invention is also meant to apply to contact recording heads and heads of optical and magneto-optical storage devices that have rotating media.

When not in use, the heads 146 can rest on the stationary disk 120 (typically on an inner portion of the disk 120 that does not contain data) or on a ramp 150 positioned either adjacent to a disk 120 or just over the disk surface. Refinements in disk fabrication have enabled manufacturers to produce disks 120 having ultra-smooth surfaces. Use of a disk 120 having an ultra-smooth surface can introduce a potential failure mechanism wherein electrostatic forces between the slider 144 and the ultra-smooth surface can cause the slider 144 to stick to the surface. If the speed of rotation of the disk 120 slows such that the air bearing between the slider 144 and disk 120 collapses, the slider 144 can contact and stick to the surface of the disk 120, causing catastrophic failure of the hard disk drive 100. For example, sticking can cause the disk 120 to abruptly lock in position or sticking can cause the slider 144 to be forcibly disconnected from the suspension 142. Thus, when the hard disk drive 100 is not in use and rotation of the disks 120 is slowed and stopped (i.e., the disks 120 are "spun down"), the heads 146 can be removed from close proximity to the disk 120 surface by positioning the suspension 144 on a ramp 150 located either adjacent to the disk 120 or just over the disk 120 surface before the disk 120 slows down such that the air bearing cannot be maintained.

Figure 2:
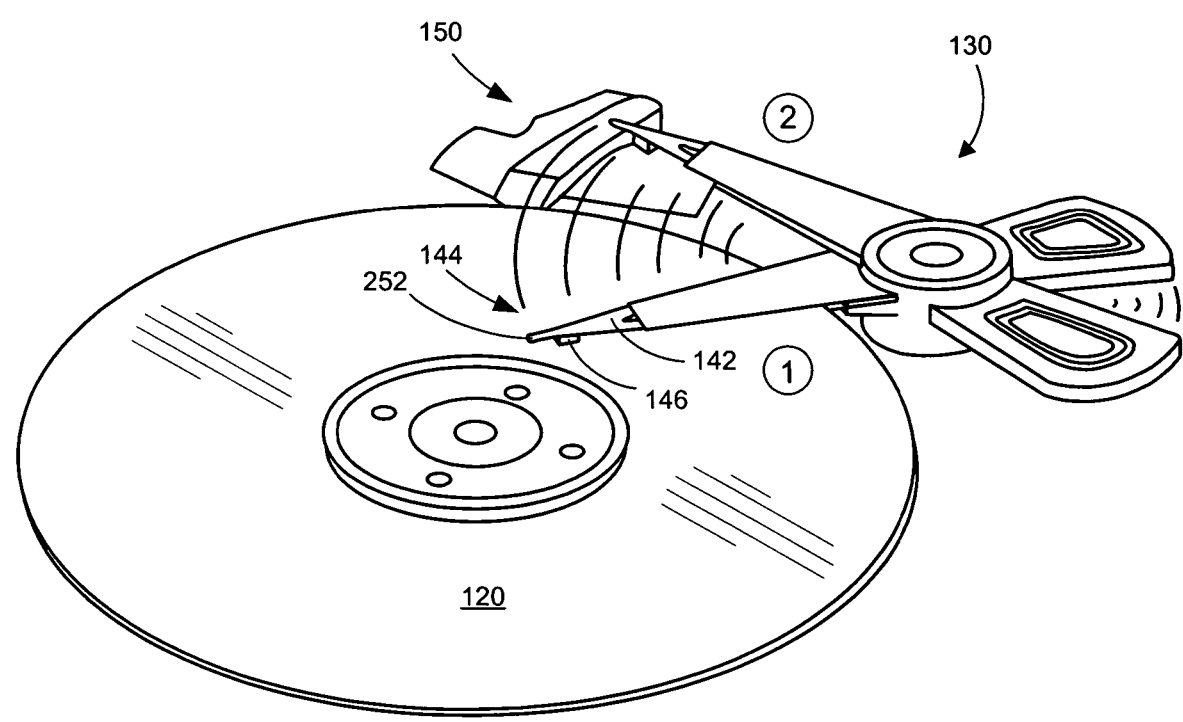
FIG. 2 is a perspective view of the motion of the rotary actuator of FIG. 1A unloading the head from the disk.

FIG. 2 illustrates motion of the actuator 130 during unloading from an exemplary disk 120 and during positioning of the head 146 and suspension 142 on the ramp 150. The actuator 130 pivots from location 1, where the head 146 is positioned over the surface of the rotating disk 120, to location 2, where the head 146 is positioned adjacent to the disk 120. The range of motion of the actuator 130 is commonly referred to as a stroke. The head 146 is unloaded from the disk 120 by pivoting the actuator 130 such that a suspension lift tab 252 extending from the suspension 142 contacts the ramp surface and slides up the ramp 150. The position along the ramp 150 where the suspension 142 first contacts the ramp 150 can be called the touch-point. As the suspension 142 slides up the ramp 150 from the touch point, the ramp 150 opposes the spring force of the suspension 142 and forces the slider 144 (and the head 146) away from the disk surface. The HSA 140 can continue its motion along the stroke by traveling up the grade portion of the ramp 150 to a substantially flat portion that optionally can include a detent for cradling the lift tab 252. The head 146 can be loaded back onto the disk 120 after the disk spins up to a safe speed. In other embodiments, the suspension 142 contacts the ramp 150 at a location along the suspension 142 between the head 146 and the pivot point. Unloading the head 146 from the disk 120 prevents sticking, and further provides resistance to damage from non-operating shock by allowing the head 146 to be suspended over a significantly wide air gap between the head 146 and an opposing head or surface, rather than placing the head 146 in close proximity to the rigid disk 120 surface.

Figure 3A:
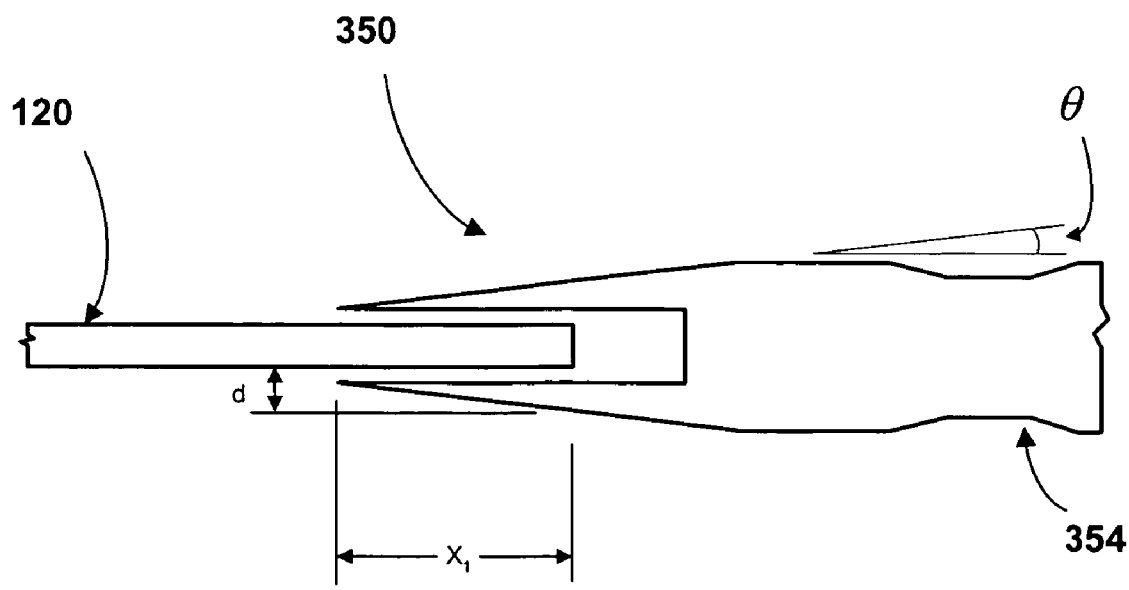
FIG. 3A is a side view of a ramp having a low grade slope.
Figure 3B:
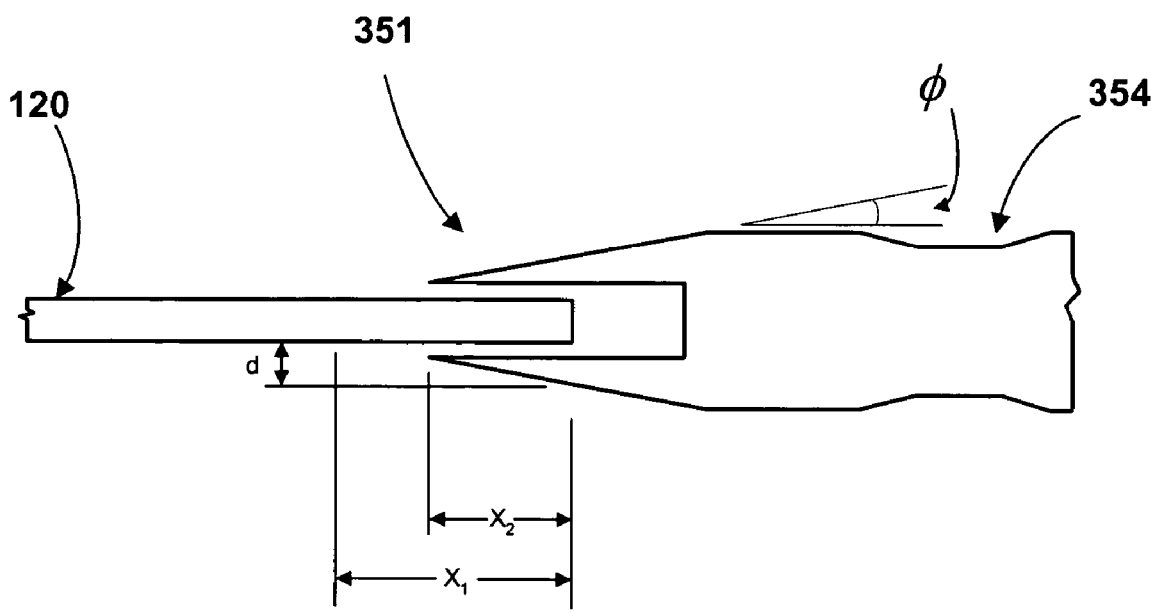
FIG. 3B is a side view of a ramp having a steep grade slope.

FIGS. 3A and 3B illustrate examples of a ramp 150 positioned over a disk 120 surface. A typical hard disk drive 100 can commonly include a ramp 350 having a low grade θ, for example less than ten degrees, extending along the stroke from a position inside the OD of the disk 120 to beyond the OD of the disk 120. In environments where the hard disk drive 100 is prone to sudden power drops or power loss, the low grade ramp 350 can provide an advantage over a ramp having a higher grade when driving the head 146 to a parked position. Less power is required to force the suspension 142 up the low grade ramp 350 and into a parked position. The low grade ramp 350 extends from a position along the stroke far enough inside the OD that the suspension lift tab 252 contacts the ramp 350 and moves far enough up the ramp 350 that the head 146 separates from the surface of the disk 120 before the slider 144 reaches the edge of the disk 120 (separation occurs when the lift tab 252 is a distance d from the surface). The low grade ramp 350 can extend a distance $x_1$ over a significant number of data tracks at the OD of the disk 120, causing the data tracks to be unused. Unfortunately, data tracks at the OD of the disk 120 have the largest circumference and are therefore the most valuable data tracks.

Alternatively, a typical hard disk drive 100 can commonly include a ramp 351 have a steep grade φ, for example greater than ten degrees. The steep grade ramp 351 can be positioned so that the ramp 351 extends a distance $x_2$, overhanging fewer less data tracks at the OD of the disk 120 than the low grade ramp 350. The steep grade ramp 351 has a touch point both close to the OD of the disk 120, and closer to the inner edge of the ramp 351. Because of the steeper grade of the ramp 351, the head 146 is more quickly removed from the surface of the disk 120. The steep grade ramp 351 overhangs fewer data tracks, but requires more power to drive the head 146 to the parked position. Where power is abruptly lost, a hard disk drive 100 employing a steep grade ramp 351 can have insufficient power to drive the head 146 to the parked position.

Figure 4A:
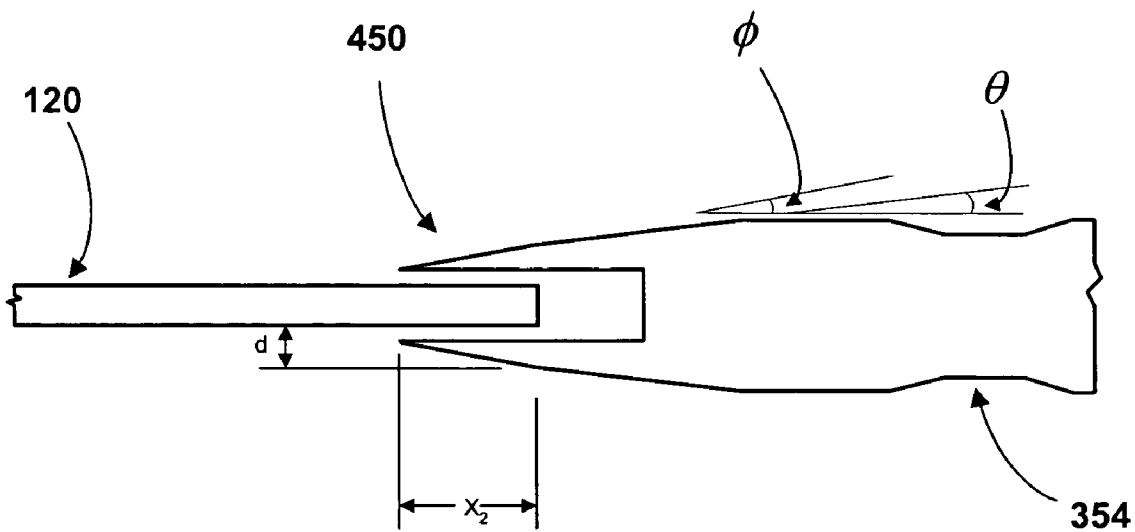
FIG. 4A is a side view of a compound ramp in accordance with one embodiment of the present invention.

As illustrated in FIG. 4, a ramp in accordance with one embodiment of the present invention can include a compound slope having both a steep grade portion and a low grade portion. The steep grade portion of the compound ramp 450 can include a steep grade φ, for example twelve degrees, having a touch point closer to an inner edge of the ramp 450 and adapted to draw the head 146 off of the disk surface more quickly than a low grade ramp 350 at a constant pivot velocity.

The compound ramp 450 can further include a transition to a low grade portion having a low grade θ, for example seven degrees, the transition occurring at a distance along the ramp 450 such that the head 146 has lifted off of the disk surface. The suspension 142 can continue its motion along the stroke by traveling up the low grade portion to a landing zone that optionally can include a detent 354. The continuing motion between the transition and the detent 354, where a detent 354 is used, requires less power to accomplish than a continuing motion up the steep grade ramp 351 to the detent 354. By transitioning to a low grade slope, sufficient power can be available to park the head 146 after a sudden loss of power to the hard disk drive 100. High voltage is needed only for the brief period needed to lift the head 146 off of the disk surface. The available tracks at the OD can be increased over a hard disk drive 100 utilizing only a low grade ramp 350.

In other embodiments, the transition between the steep grade φ and the low grade θ can be positioned closer to the leading edge of the ramp 450 or farther away. In still other embodiments, the ramp 450 can include multiple transitions having progressively lower grades. Further, the ramp 450 can include a blunt leading edge rather than an edge coming to a point or include a ramp positioned further from the surface of the disk, thereby reducing the amount of data tracks over which the ramp 450 hangs, allowing additional data tracks to be written to and read from. The leading edge of the ramp must have a minimum height such that a nominal touch point is higher than the leading edge after accounting for fly-height variation and variation in forming the suspension lift tab 252, etc. One of ordinary skill in the art can appreciate the variation in designing a ramp 450 having portions with different grades.

Figure 4B:
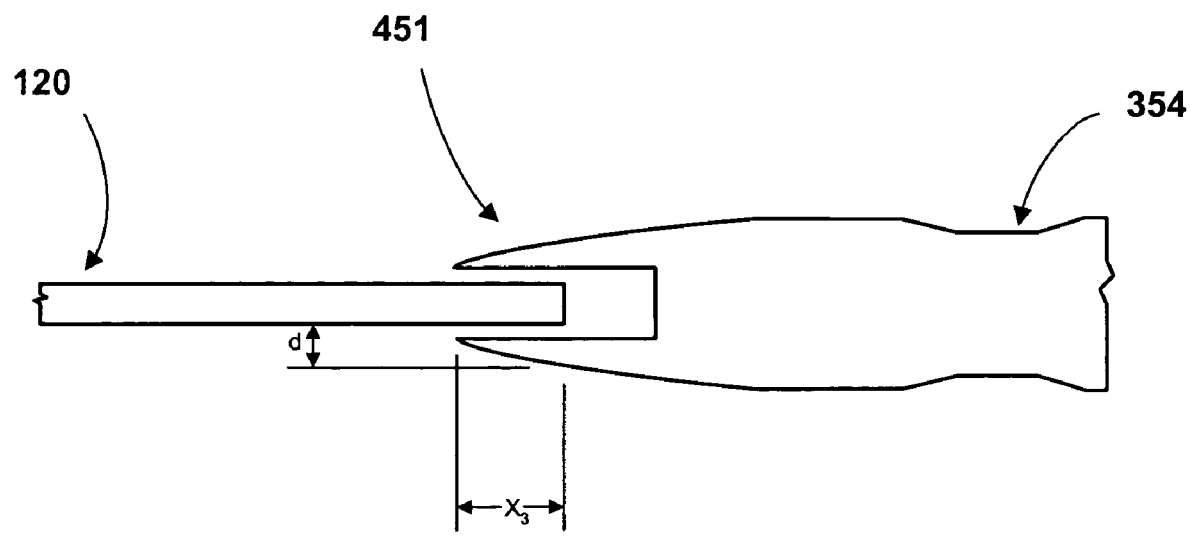
FIG. 4B is a side view of a ramp having a curved, varying slope in accordance with one embodiment of the present invention.

As can be seen in FIG. 4B, a ramp in accordance with an alternative embodiment of the present invention can include a gradual transition from a steep grade φ to a low grade θ. The ramp 451 can include a gradual and continuous transition such that the surface of the ramp 451 traces a curve. For example, the surface of the ramp 451 can be optimized such that the ramp 451 includes a much more severe grade that transitions to the steep grade φ near the nominal touch point, further continuously transitioning to the low grade θ as the suspension is lifted off of the disk surface. Such a design can extend over a distance $x_3$, overhanging still fewer data tracks at the OD of the disk 120 than a low grade ramp. One of ordinary skill in the art can appreciate the different variations in curvature for producing a result minimizing unused data tracks at the OD of the disk 120 with an appropriate power requirement for parking the head 146.

Figure 5:
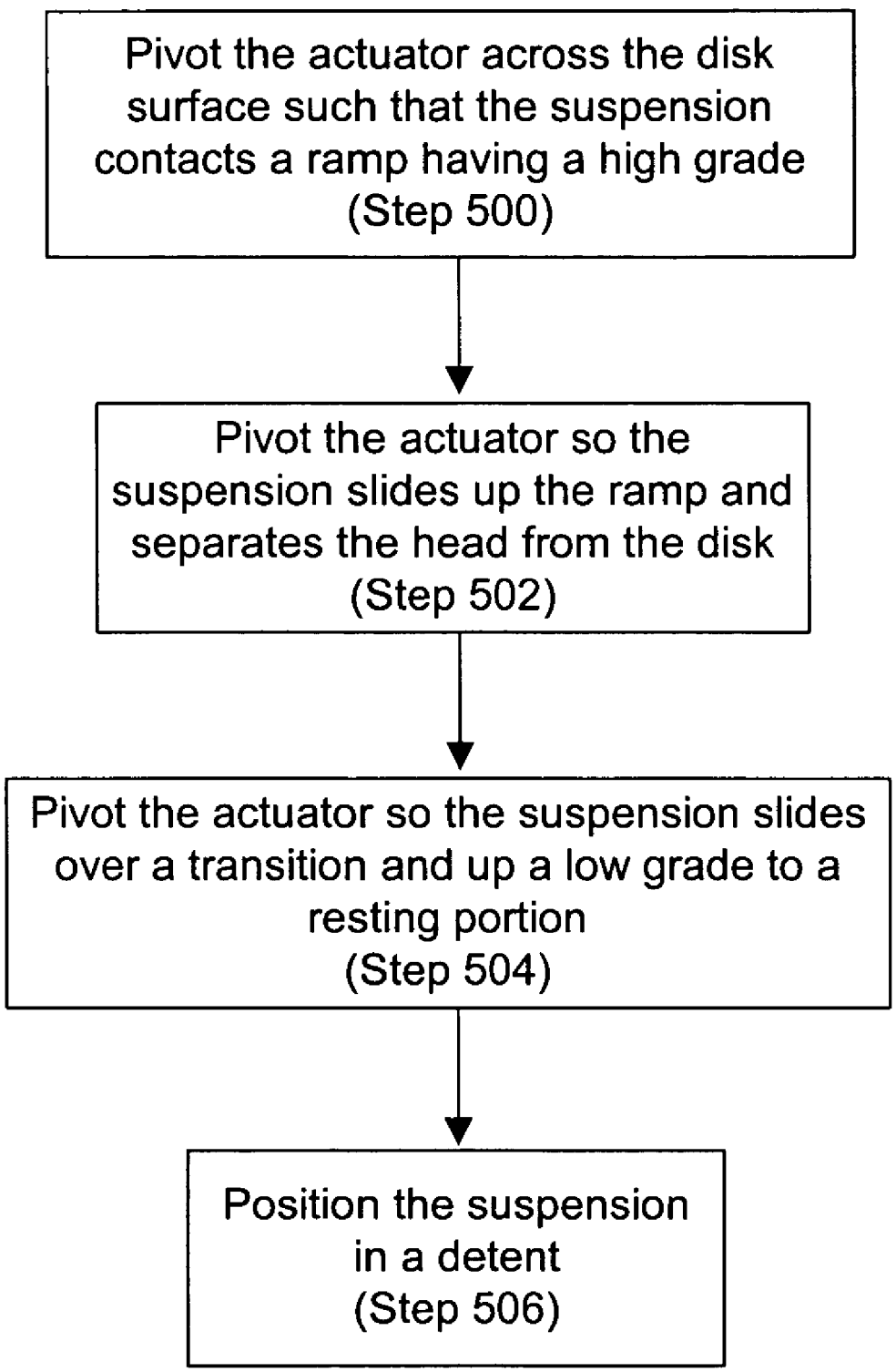
FIG. 5 is a flowchart of a method in accordance with one embodiment of the present invention to pivot a rotary actuator to a parked position on the ramp of FIG. 4A during and/or after power down from shock and vibration.

A method in accordance with one embodiment of the present invention is herein disclosed to pivot a rotary actuator 130 to locate an HSA 140 to a parked position, thereby preventing damage to one or more heads 146 connected with the rotary actuator 130 during and/or after power down from shock and vibration, for example. As shown in the flowchart of FIG. 5, the method includes pivoting the actuator 130 across the surface of at least one disk 120 such that at least one suspension 142 connected with each head 146 contacts at a touch point a ramp 450 having an initial steep grade φ (Step 500). The actuator 130 can continue to pivot so that the at least one suspension 142 slides up the ramp 450, thereby separating each head 146 from the surface of an associated disk 120 (Step 502). The touch point is positioned along the ramp 450 so that each head 146 will separate from the surface of the associated disk 120 with continued pivoting before the slider 144 on which each head 146 is mounted reaches an edge of the disk 120. The actuator 130 can further continue pivoting so that the suspension 142 slides over a transition of the ramp 450 and continues up a low grade θ until the suspension 142 reaches a substantially non-graded (relative to the disk 120), or resting portion of the ramp 450 (Step 504), and optionally finds a detent 354 in which to park (Step 506). The transition from the high grade portion of the ramp 450 to the low grade portion of the ramp can occur at a position along the ramp surface where the heads 146 are nominally removed from communicative proximity to the disk 120, that is, the head 146 no longer senses magnetization on the disk 120 surface. In other embodiments, the transition can occur at some other point along the ramp 120 surface. For example, the head 146 can be considered "removed" from the disk 120 when a predefined shock does not cause the head 146 to contact the disk 120 surface.

Figure 6:
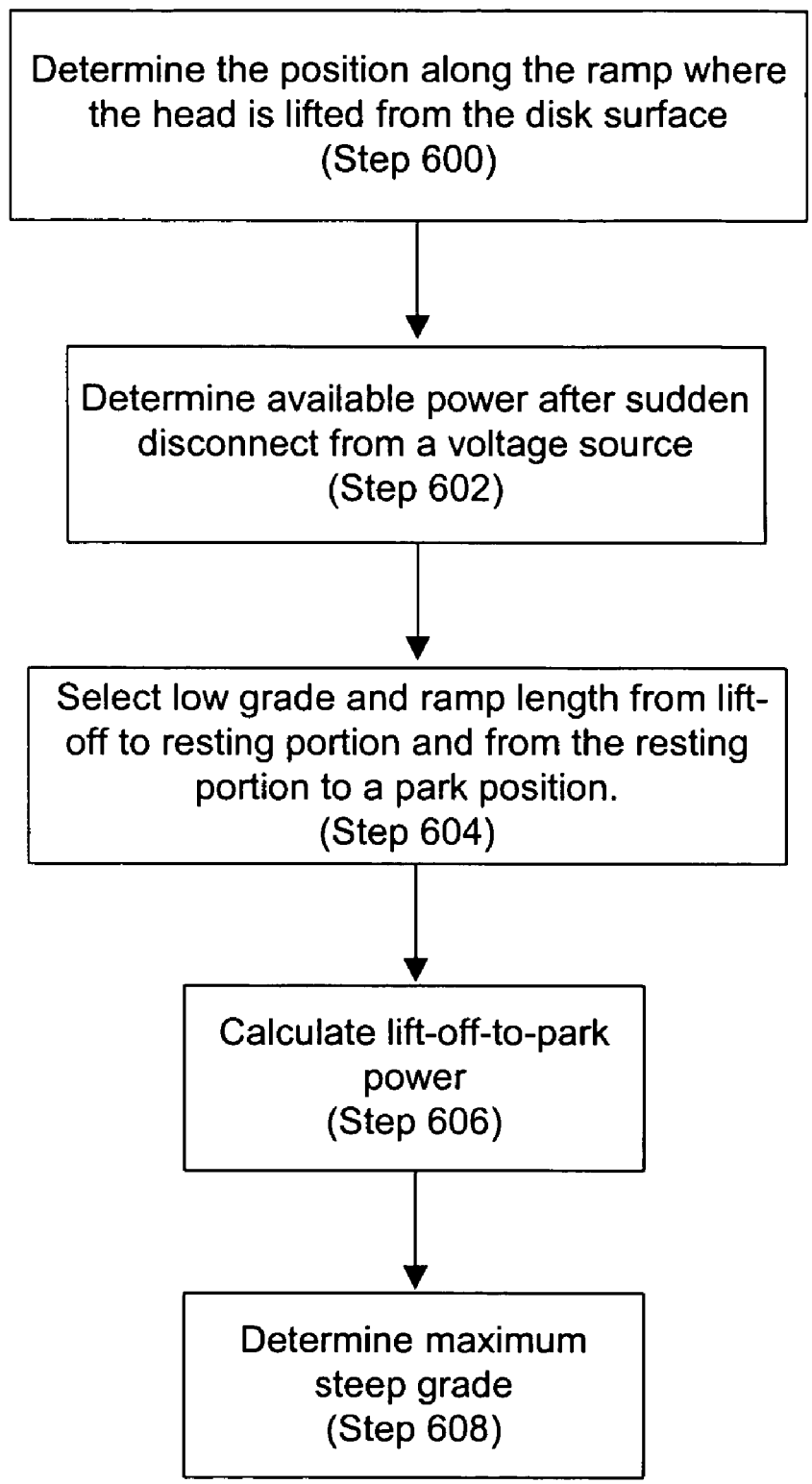
FIG. 6 is a flowchart of a method in accordance with one embodiment of the present invention to shape a ramp.

Further, a method to shaping a ramp in accordance with one embodiment of the present invention includes determining an optimal shape of the ramp 450 such that data track availability at the OD is maximized. The process of parking should be robust, for example even during sudden power loss to the hard disk drive 100. As shown in the flowchart of FIG. 6, the method includes determining the amount of lift required in a suspension 142 to acceptably remove a head 146 from the surface of a disk 120 (thus determining a lift-off position along the ramp 450) (Step 600). As described above, the head 146 can be considered "removed" from the disk 120 using different criteria. For example, the head 146 can be "removed" when the head 146 no longer senses magnetization on the disk 120 surface, or the head can be considered "removed" from the disk 120 when a predefined shock does not cause the head 146 to contact the disk 120 surface. The method further includes determining available power to the actuator 130 directly following sudden disconnect from a constant voltage source (Step 602). A low grade θ and overall ramp length from the lift-off position to a flat (or resting portion) and from the flat portion to a park position can be chosen (Step 604), and a lift-off-to-park power can be calculated (Step 606). The lift-off-to-park power is the power available to pivot the actuator 130 such that the suspension 144 slides from a position along the ramp 150 where the head is removed from the disk 120 surface to at least a resting portion of the ramp 150. The maximum steep grade φ can be determined based on the difference between the power available after a sudden loss of connection between the hard disk drive 100 and a constant voltage source, and the lift-off-to-park power (Step 608).

In another embodiment, the method can comprise choosing a maximum steep grade φ initially, and calculating the low grade θ and overall ramp length from the lift-off position to a flat portion, and from the flat portion to a park position based on the remaining available power. Still further embodiments can include choosing both the maximum steep grade φ and the low grade θ, and calculating the overall ramp length from the lift-off position to a flat portion, and from the flat portion to a park position. One of ordinary skill in the art can appreciate the different means for designing the ramp. By shaping a ramp 150 such that it includes a maximum steep grade, the surface of the disk 120 available as a data region can be maximized or optimized, potentially increasing the spacing of tracks or alternatively increasing the capacity of the disk 120. For example, after calculating the shape of the ramp 150, a first user track near the ramp 150 and a final user track near the ID can be determined and a data region defined therebetween.

The invention described herein is equally applicable to technologies using other read/write devices and other data storage media. For example, an arrangement in accordance with the embodiments described herein could be used with a rotary actuator connected with a laser or an atomic probe for writing to a polycrystalline silicon substrate. The description and illustrations provided are not intended to limit the invention to magnetic data storage technology.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

The invention claimed is:

1. A ramp to remove a read/write head connected with a suspension from a media, comprising:
   one or more surfaces connected with a resting portion such that when the read/write head is removed from the media, the suspension slides across two or more grades before contacting the resting portion;
   wherein a transition from a first grade to a second grade occurs at a nominal location at which the read/write head is removed from communicative proximity with the media.

2. The ramp of claim 1, wherein the two or more grades are progressively shallower.

3. The ramp of claim 1, further comprising:
   an first grade of twelve degrees; and
   a second grade of seven degrees.

4. The ramp of claim 1, wherein the suspension includes a lift tab extending from a distal end of the suspension for contacting the ramp.

5. The ramp of claim 1, further comprising:
   a detent disposed on a flat portion, the detent being adapted to retain the suspension.

6. The ramp of claim 1, wherein a leading edge of the one or more surfaces is substantially blunt.

7. A ramp to remove a read/write head connected with a suspension from a media, comprising:
   a first portion having a first grade;
   a second portion connected with the first portion, the second portion having a second grade;
   a flat portion connected with the second portion and adapted to allow the suspension to remain substantially stationary; and
   wherein a transition from the first grade to the second grade occurs at a nominal location at which the read/write head is removed from communicative proximity with the media.

8. The ramp of claim 7, wherein the first grade is steeper than the second grade.

9. The ramp of claim 7, further comprising:
   a detent within the flat portion, the detent being adapted to retain the suspension.

10. The ramp of claim 7, wherein the first grade is twelve degrees.

11. The ramp of claim 7, wherein the second grade is seven degrees.

12. The ramp of claim 7, wherein the suspension includes a lift tab extending from a distal end of the suspension for contacting the ramp.

13. The ramp of claim 7, wherein a leading edge of the one or more surfaces is substantially blunt.

14. A ramp to remove a read/write head connected with a suspension from a media, comprising:
   a sloped portion having a continuously regressive grade; and
   a flat portion connected with the sloped portion and adapted to allow the suspension to remain substantially stationary;
   wherein the grade of the sloped portion has regressed at or below a low grade at a nominal location at which the read/write head is removed from communicative proximity with the media.

15. The ramp of claim 14,
   wherein the sloped portion has an initial grade of twelve degrees; and
   wherein the sloped portion has a low grade of seven degrees.

16. The ramp of claim 14, wherein the suspension includes a lift tab extending from a distal end of the suspension for contacting the ramp.

17. The ramp of claim 14, further comprising:
   a detent within the flat portion, the detent being adapted to retain the suspension.

18. The ramp of claim 14, wherein a leading edge of the one or more surfaces is substantially blunt.

19. A ramp to remove a read/write head connected with a suspension from a media, the ramp being positioned over the surface of the media and having a graded portion and a parking portion, wherein the improvement includes:
   the graded portion includes a first grade and a second grade; and
   wherein a transition from the first grade to the second grade occurs at a nominal location at which the read/write head is removed from communicative proximity with the media.

20. A system for storing and retrieving information, comprising:
   a housing;
   a disk connected with the housing;
   a rotary actuator connected with the housing, the rotary actuator including:
      an arm;
      a suspension connected with the arm, the suspension being adapted to apply a spring force to a surface of the disk;
      a slider connected with the suspension; and
      a read/write head disposed on the slider; and
   a ramp including:
      a first portion having a first grade;
      a second portion connected with the first portion, the second portion having a second grade;

a flat portion connected with the second portion and adapted to allow the suspension to remain substantially stationary; and wherein a transition from the first grade to the second grade occurs at a nominal location at which the read/write head is removed from communicative proximity with the media.

21. A system for storing and retrieving information, comprising:

a housing;

a disk connected with the housing;

a rotary actuator connected with the housing, the rotary actuator including:

an arm;

a suspension connected with the arm, the suspension being adapted to apply a spring force to a surface of the disk;

a slider connected with the suspension; and a read/write head disposed on the slider; and a ramp including:

a first portion having a first grade;

a second portion connected with the first portion, the second portion having a second grade;

a flat portion connected with the second portion and adapted to allow the suspension to remain substantially stationary; and wherein a transition from the first grade to the second grade occurs at a nominal location at which the read/write head is removed from communicative proximity with the media.

22. A system for storing and retrieving information, comprising:

a housing;

a disk connected with the housing;

a rotary actuator connected with the housing, the rotary actuator including:

an arm;

a suspension connected with the arm, the suspension being adapted to apply a spring force to a surface of the disk;

a slider connected with the suspension; and a read/write head disposed on the slider; and a ramp including:

a sloped portion having a continuously regressive grade; and wherein the grade of the sloped portion has regressed at or below a low grade at a nominal location at which the read/write head is removed from communicative proximity with the media.

23. A method for removing a read/write head connected with a suspension from communication with a disk, the suspension being connected with a rotary actuator, comprising:

pivoting the rotary actuator so that the suspension contacts a ramp having one or more surfaces connected with a flat portion such that as the rotary actuator pivots, the suspension slides across two or more grades before contacting the flat portion;

transition from a first grade to a second grade at a nominal location at which the read/write head is removed from communicative proximity with the media; and positioning the rotary actuator such that the suspension rests in a detent disposed on the flat portion.

24. A method to determine a shape of a ramp for a hard disk drive, comprising:

calculating a dissipation power remaining after a sudden power loss to the hard disk drive;

calculating a flat-to-park power needed for a ramp having a flat portion of a fixed flat length;

calculating a second-to-flat power needed for a ramp having a second portion of a fixed second grade and second length;

calculating a first-to-second power by subtracting the flat-to-park power and second-to-flat power from the dissipation power;

calculating a maximum first grade from the first-to-second power; and calculating a first length from the first grade.

* * * * *